(12) United States Patent
Wen et al.

(10) Patent No.: US 6,317,210 B1
(45) Date of Patent: Nov. 13, 2001

(54) APPARATUS FOR RECORDING FLY HEIGHT MEASUREMENT

(75) Inventors: Jianming Wen, Pleasanton; King L. Wong, Saratoga, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/435,590

(22) Filed: Nov. 8, 1999

Related U.S. Application Data

(60) Provisional application No. 60/108,368, filed on Nov. 13, 1998.

(51) Int. Cl.⁷ .................................................. G01B 11/14
(52) U.S. Cl. .............................................................. 356/375
(58) Field of Search ..................... 356/373, 375, 356/357, 358, 345

(56) References Cited

U.S. PATENT DOCUMENTS

| | | | |
|---|---|---|---|
| 5,502,565 | * 3/1996 | Fukuzawa et al. | 356/357 |
| 5,638,207 | * 6/1997 | Fukuzawa et al. | 359/375 |
| 5,706,080 | * 1/1998 | Pekin et al. | 356/72 |
| 5,719,677 | * 2/1998 | Guerra | 356/375 |
| 5,781,299 | * 7/1998 | Womack et al. | 356/357 |
| 5,808,736 | * 9/1998 | Womack et al. | 356/243 |
| 5,880,840 | * 3/1999 | Li | 356/357 |
| 6,058,094 | * 5/2000 | Davis et al. | 369/112 |

* cited by examiner

Primary Examiner—Frank G. Font
Assistant Examiner—Michael P. Stafira
(74) Attorney, Agent, or Firm—Moser, Patterson & Sheridan LLP

(57) ABSTRACT

The present invention provides a method and apparatus for measurement and characterization of flying heads for use over disks that comprise non-rigid substrates and/or over disks that exhibit properties such as increased amounts of flutter and/or rotational run-out.

19 Claims, 5 Drawing Sheets

APPARATUS FOR RECORDING FLY HEIGHT MEASUREMENT

RELATED APPLICATIONS

The present application is related to and claims priority from Provisional Application Ser. No. 60/108,368, filed Nov. 13, 1998, and is incorporated herein by reference.

FIELD OF THE INVENTION

The present invention relates generally to apparatus for characterization of flying heads and more particularly relates to an apparatus for characterization of flying heads for use over nonrigid disks.

BACKGROUND

Today's hard disk drive products utilize disks that comprise rigid substrates. The substrates may comprise rigid materials such as aluminum, glass, and ceramics. It is well known in the art that when a disk that comprises a rigid substrate is rotated at a high speed, it will exhibit a certain amount of disk flutter and rotational run-out. In the prior art disk, because the disk is rigid, the disk flutter and rotational run-out is relatively small. In the prior art, disk flutter and rotational run-out causes the formation of aerodynamic turbulence over the surfaces of the rotating disk; however, because the disk is rigid, the aerodynamic turbulence is also relatively small.

Before actual shipment of a disk drive, it is desirable to characterize the components comprising the disk drive. In a disk drive that utilizes flying head technology, characterization of the components includes characterization of the flying heads. The need for characterizing flying heads stems from the fact that if a flying head is manufactured with non-optimal dimensions and/or quality, its ability to fly may be adversely affected by the aerodynamic turbulence over a rotating disk. Electrical and/or optical components on the flying head may further enhance the effects of the aerodynamic turbulence. Thus, it is desirable to measure and characterize flying heads to determine how their dimensional characteristics and/or quality may be affected by aerodynamic turbulence prior to their inclusion in a finally assembled disk drive product.

While the dimensional characteristics and/or quality of a flying head may be sufficient to maintain the flying head over a rotating disk that comprises a rigid substrate, they may not be adequate enough to maintain the flying head in a flying condition over a disk that exhibits increased amounts of disk flutter and/or rotational run-out.

In the prior art, flying heads are typically characterized during a test procedure that is conducted prior to final assembly of the disk drive. The characterization test utilizes monochromatic multi-beam interference based test instrumentation to measure the fly height between a flying head and a clear smooth rotating glass test disk. In the prior art, the test disk is designed to exhibit the same properties as that of the rigid disks used in the finally assembled disk drive. Unfortunately, this prior art approach does not characterize flying heads for use over disks that may exhibit increased amounts of flutter and/or run-out.

Thus, what is needed is a method and apparatus for measurement and characterization of flying heads for use over disks that comprise non-rigid substrates and over disks that exhibit properties such as increased amounts of flutter and/or rotational run-out.

SUMMARY OF THE INVENTION

The present invention provides a method and apparatus for measurement and characterization of flying heads for use over disks that comprise non-rigid substrates and over disks that exhibit properties such as increased amounts of flutter and/or rotational run-out.

The present invention includes a head testing apparatus that comprises a non-rigid substrate, a source of light, and a detector, wherein the source of light is directed to the substrate and to the detector. The substrate may comprise a transparent substrate. The substrate may be transparent to at least one wavelength of the source of light. The substrate may be transparent to three wavelengths of the source of light. The substrate may comprise a rotating disk. The rotating disk may comprise a plastic. An output of the detector may be representative of a characterization of the head. An output of the detector may be representative of a fly height of the head. The head may comprise a flying head. The head may comprise a flying optical head. The head may comprise a flying magneto-optical head.

The present invention may also include a test disk for characterization of heads wherein the test disk comprises a non-rigid substrate. The non-rigid substrate may comprise a plastic. The non rigid substrate may comprise a thickness of less than or equal to 1.2 millimeters. The non-rigid substrate may comprise features. The features may comprise stamped servo features. The test disk may be transparent to at least one wavelength. The test disk may be transparent to three wavelengths of light.

The present invention may also include a testing apparatus, comprising a test substrate means for testing a flying head, a light delivery means for delivering light to the test substrate means, and a detector means for detecting the light and for providing an output based on the light. The output may be representative of a characterization of the head over the test substrate means.

DETAILED DESCRIPTION OF THE INVENTION

Figure 1:
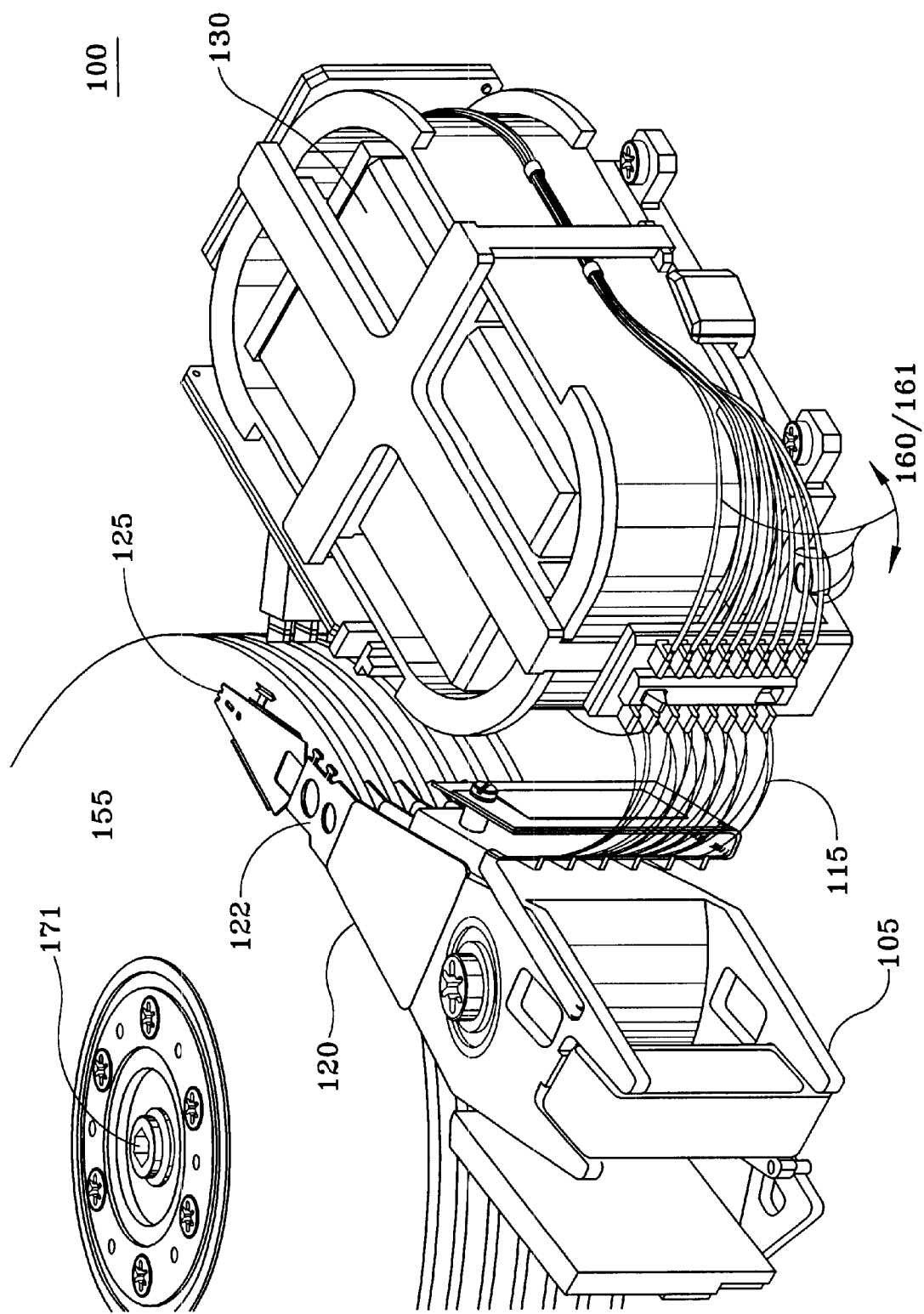
FIG. 1 shows a perspective view of a disk drive.
Figure 2:
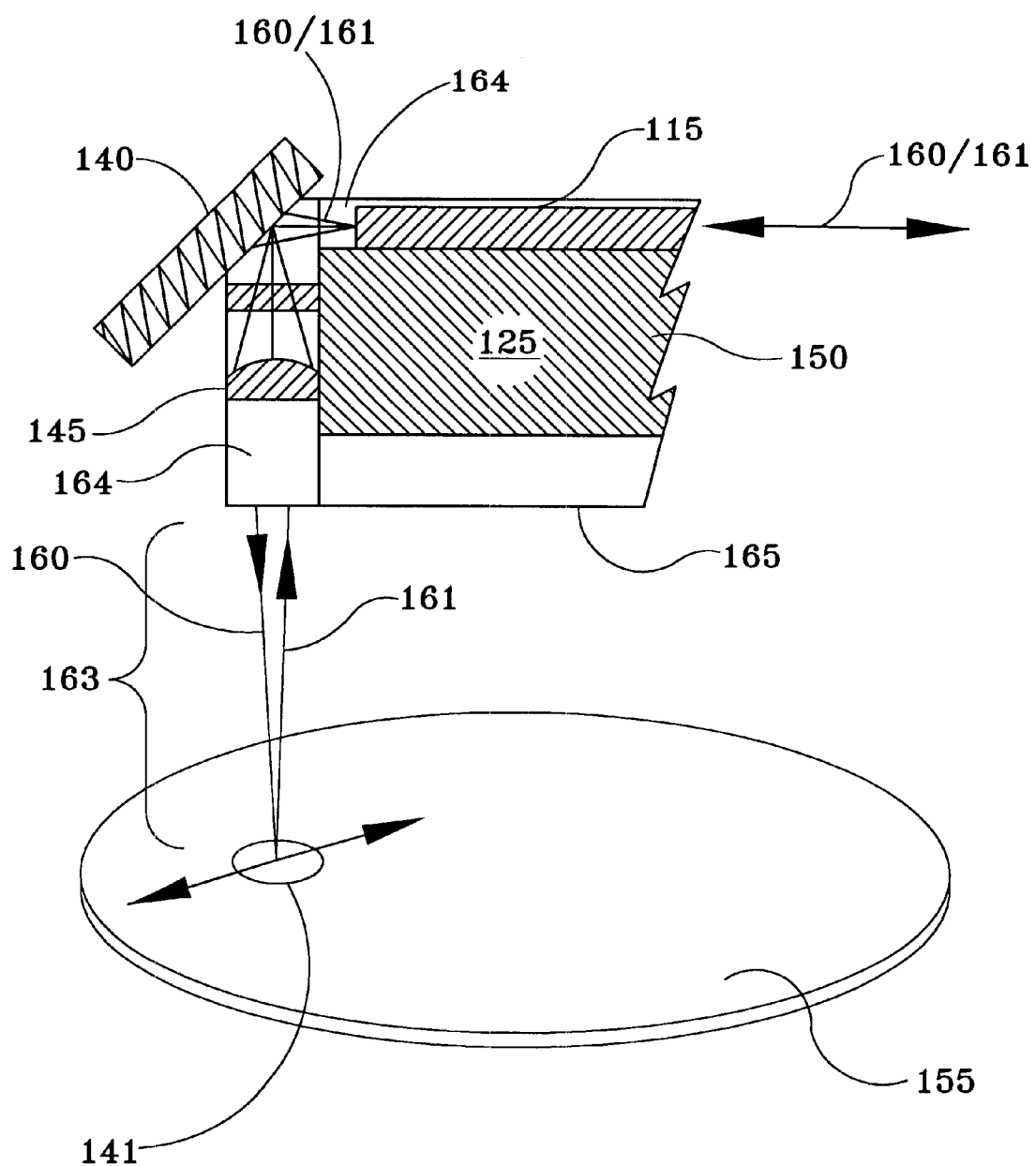
FIG. 2 shows operation of a disk drive.

Referring in detail to the drawings wherein similar parts are identified by like reference numbers, there is seen in FIG. 1 and in FIG. 2 respective views of a disk drive 100 and a view of components of the disk drive in operation. The disk drive 100 comprises a set of rotating disks 155 which are rotated by a spindle motor assembly 171. The disk drive 100 further comprises individual flying heads 125, each of which is coupled to individual arms 120 through respective suspensions 122. In the one embodiment, the rotating disks 155 comprise magneto-optical disks and the flying heads 125 comprise flying magneto-optical heads. Those skilled in the art will recognize that flying head technology utilizes air bearing surfaces that rely on aerodynamic is air flow to maintain the flying head 125 in a flying condition over the disks 155. A new and novel method and apparatus for using optics and magneto-optical technology in combination with flying head technology is described in patent application Ser. No. 08/823,422, filed Mar. 24, 1997, which is assigned to the Applicants of the present application and which is incorporated herein by reference. FIG. 1 also illustrates a group of individual optical fibers 115, which are coupled to an optical switch 130 at one end and to respective flying heads 125 at an opposite end. The optical switch 130 acts to selectively direct light 160/161 between a laser source (not shown) and a particular one of the individual optical fibers 115. The light 160 transmits information to be stored to the disk 155, and the light 161 is reflected from the disk 155 in a manner that conveys information for subsequent read-out. The optical fibers 115 direct the light 160/161 between the optical switch 130 and a particular flying head 125. The flying head 125 includes optics 115, 140, 145 (FIG. 2) to direct and focus the light 160 as a spot 141 onto a particular disk 155 and to detect a reflection of the spot 141 from the disk.

It is well known in the prior art that flying head technology may also be used to maintain magnetic heads over rotating magnetic disks. In prior art disk drives that utilize magnetic flying heads and magnetic disks, it is preferred to maintain the heads with as low fly height as possible so as to provide increased areal density readout as well as improved readout. A minimum fly height is typically the fly height at which aerodynamic turbulence from disk flutter and rotational run-out creates aerodynamic instabilities over the disk. Such aerodynamic instabilities tend to cause, what is known in the art as, "head crashes."

In drive 100, those skilled in the art will understand that as fly height (indicated by 163) is decreased, the light 160 can be focused to provide a smaller spot 141, and that as the spot 141 is made smaller, more information can be stored and read using the disk 155. Unfortunately, as the fly height 163 is decreased, the probability that aerodynamic effects from disk flutter and/or rotational run-out will affect the flyability of the flying head 125 increases; which is the case when the disk 155 of the drive 100 is used.

Figure 3A:
FIGS. 3a–c are various views of a disk of the present invention.
Figure 3B:
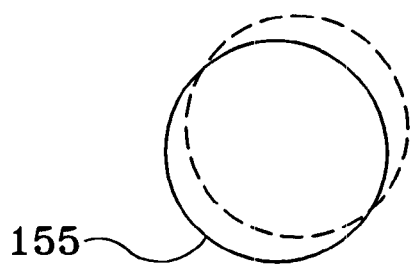
Figure 3C:
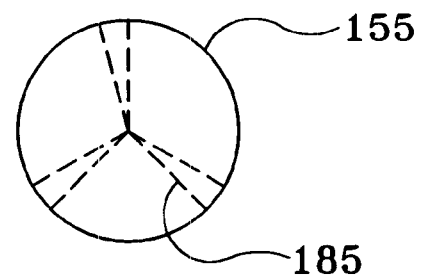

Referring now to FIGS. 3a–c, there are seen various views of the disk 155. In the preferred embodiment, the disk 155 comprises a substrate made of a non-rigid material, such as plastic, or the like. Because the disk 155 is non-rigid, as the disk 155 rotates it may exhibit more disk flutter and rotational run-out than the rigid disks of the prior art. Plastic like substrates provide advantages of low cost, low mass, and the ability to easily stamp features onto the surfaces of the substrates. Disk flutter is graphically illustrated in a side view of the disk 155 in FIG. 3a, and rotational run-out is graphically illustrated in a top view in FIG. 3b. As illustrated in FIG. 3c, the disk 155 may also comprise raised or depressed features, for example, stamped pits and/or grooves used as servo marks 185. Disk flutter, rotational run-out, and features all may act to create aerodynamic turbulence that can affect the ability to fly the flying head 125 over the disk 155. Because disk flutter and rotational run-out is more pronounced when a non-rigid substrate is used, the flyability of the flying head 125 over the disk 155 of the disk drive 100 may be, thus, more negatively affected than in prior art drives.

Figure 4:
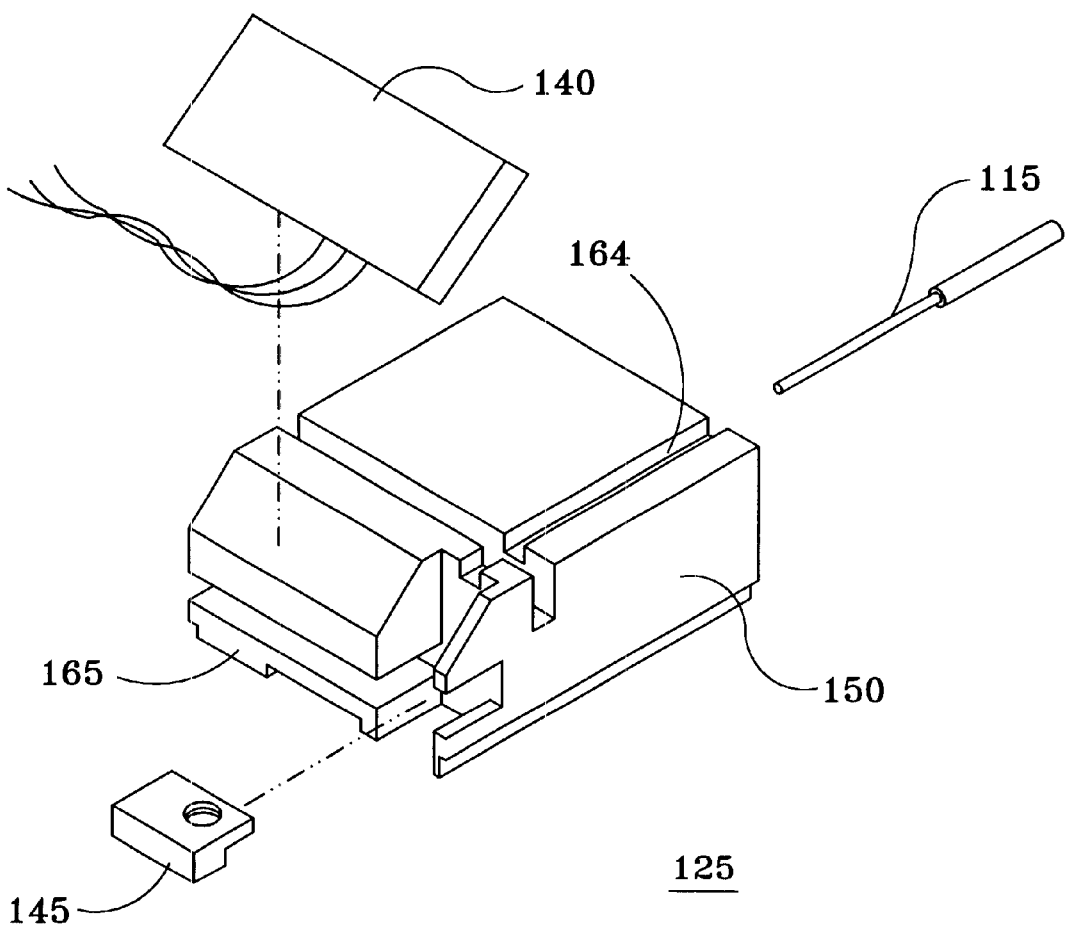
FIG. 4 is a close up view of a flying head of the present invention.

Referring now to FIG. 4, there is seen a close up view of a flying head. In the preferred embodiment, the flying head 125 of the present invention comprises: a body 150, grooves and apertures 164 to hold various optical and/or electrical components 115, 140, 145, and a set of slider rails 165. It is understood that the dimensions of the body, the grooves, the apertures, the various components, the set of slider rails, and the dimensional relationship between each of these items to each other can differ in other embodiments that require different performance characteristics. It is also understood that during manufacture of the flying head 125 unintended variations in dimensions of the head may occur. In some cases, the variations may be small, but in others, they may be of sufficient magnitude that they may affect the ability of the flying head 125 to fly with an adequate fly height over the disk 155. Furthermore, the presence of the optical components on the flying head 125 may further affect its flyability, such that the effects of disk flutter, rotational run-out, features, and surface roughness may be even more pronounced. In the case of a drive 100 that utilizes a disk 155 that comprises a non-rigid substrate, wherein aerodynamic turbulence or windage above the disk 155 is increased over that of prior art drives, the flyability of the flying head 125 may, thus, be even more compromised, for example, to the point where a "head crash" may occur. The present invention identifies that it is desirable, therefore, to test/characterize the flying head 125 before use of the head in a finally assembled disk drive 100.

Figure 5:
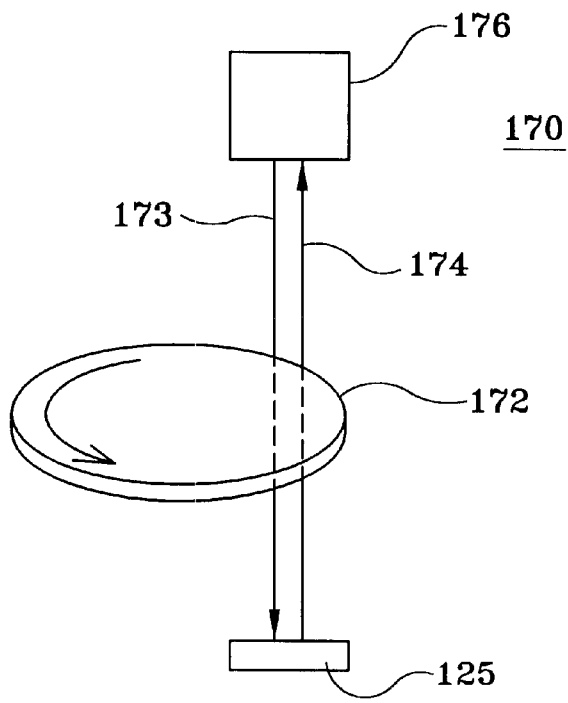
FIG. 5 shows a prior art flying head tester.

Referring now to FIG. 5, there is seen a prior art flying head tester. Those skilled in the art will identify that prior art flying head testers 170 are available for testing flying heads for use over disks that comprise rigid substrates, for example, for testing flying magnetic heads 171 for eventual use over rigid magnetic disks. In prior art testers, a thick smooth clear glass test disk 172 is used to simulate the properties exhibited by the prior art magnetic disks. It is well known in the art that the prior art magnetic disks comprise a rigid substrate made of, for example: a glass, a metal, or the like. The test disk 172 is clear and comprises a thickness of 6.35 mm. The rotating test disk 172 creates an aerodynamic condition that is preferably very similar to that experienced in the prior art disk drives. During testing/characterization of prior art flying heads, a flying head 171 is placed facing the test disk 172, and the test disk is rotated. The fly height above the test disk is measured by directing a beam of light 173 perpendicularly through the rotating disk towards the flying head 171. This test methodology utilizes monochromatic multi-beam interference based test instrumentation 176 and theory that is well known in the art and is not elaborated here any further other than to say that variations in intensity of a return beam of light 174 are detected by the instrumentation and used to evaluate the flyability of the flying head 172 at various positions over the rotating test disk 172.

It is understood from the preceding discussion that the prior art flying head tester 170 does not characterize flying heads for use over a disk that comprise a non-rigid substrate. Thus, although a particular flying head 125 of drive 100 may pass the characterization test conducted by the prior art tester 170, the flying head 125 may, nevertheless, not have sufficient dimensional characteristics and/or quality to fly over the non-rigid substrate of the disk 155. Furthermore, although the flying head 125 may fly at some fly height over a rigid disk, it may not be capable of flying at the fly height that is needed to focus the light 160 as a sufficiently small spot 141.

Figure 6:
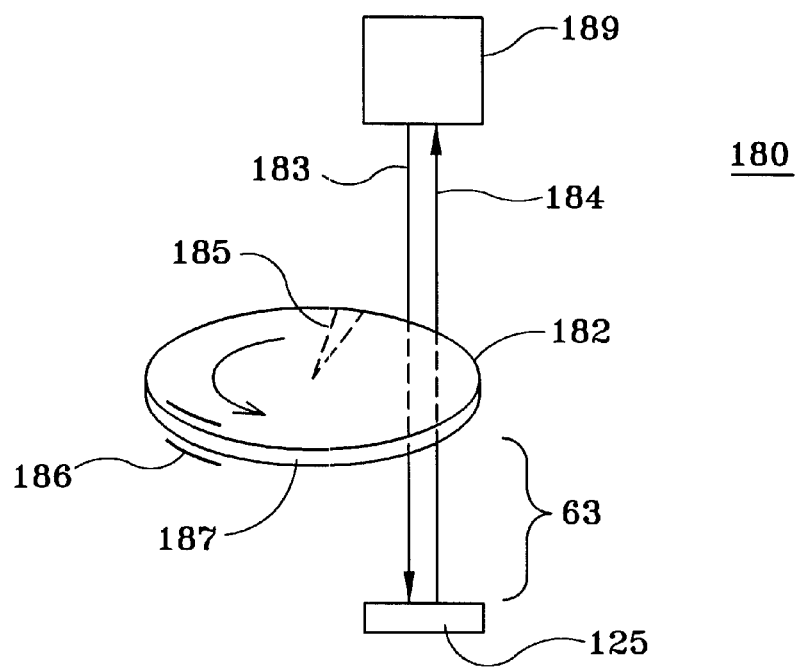
FIG. 6 show a flying head tester of the present invention.

Referring now to FIG. 6, there is seen a flying head tester 180 of the present invention. The present invention utilizes some of the concepts of the prior art flying head tester 170, but does so by identifying that its design does not contemplate that at least one important change must be made to its design. This change is necessitated because it is desired to test the flying heads 125 in an environment that approximates the aerodynamic turbulence that is present in drive 100, not the aerodynamic turbulence present in the prior art disk drives, in particular, the aerodynamic turbulence that may exist over a disk 155 that comprises a non-rigid substrate. To this end, the present invention identifies that the characteristics of the rotating test disk 182 should approximate those of the disk 155. In other words the test disk 182 should exhibit disk flutter, rotational run-out, features, and/or surface roughness that are similar to that of the disks 155 that are used in drive 100.

In the preferred embodiment, the test disk 182 comprises a non-rigid substrate 187, for example, a plastic, a polycarbonate. or the like. In an exemplary embodiment, the non rigid test disk comprises a 1.2 mm thickness, a 130 mm diameter, and a 40 mm inner diameter hole. In some embodiments, the test disk 182 may also include features 185, for example, stamped features such as servo pits and the like. The features 185 may be provided on the test disk 182 when it is desired to better approximate the aerodynamic turbulence that these features add to the overall turbulence above the rotating disk 155. It is understood that the test disk should also be protected in some manner from incidental contact with, for example, the flying head 125. To this end, in the preferred embodiment, a set of thin films 186 may be deposited over the substrate 187. The thin films 186 do not necessarily have to be the same films used on an actual disk 155. In one embodiment, the substrate 187 may comprise a 100 Å amorphous carbon overcoat and a 25 Å Zdol lubricant. The present invention identifies that the thin films should also be transparent to the particular light 183 used by the monochromatic multi-beam interference based test instrumentation 189. The present invention also identifies that to facilitate transmission of the light 183, 184 through the test disk 182, the test disk should also be transparent to the particular light source used by the monochromatic multi-beam interference based test instrumentation 189. In an exemplary embodiment, the test disk 182 is transparent at 436 nm, 546 nm, and 580 nm; the non-rigid plastic substrate 187 as well as the thin films of the test disk 182 preferably provides such transparency. In the preferred embodiment, the test instrumentation 189 comprises three detectors (not shown), one each for detecting a particular of the three wavelengths. It is understood that use of other wavelengths is within the scope of the present invention as long as the particular substrate 187 and thin films are sufficiently transparent to the wavelengths.

Thus, in the exemplary embodiment described above, the test disk 182 approximates dimensional and mechanical properties of the disk 155 such that the aerodynamic turbulence created above the rotating test disk 182 may be simulated to test the flyability of the flying heads 125. A properly functioning flying head 125 which experiences turbulence above the rotating test disk 182, thus, can, be tested to verify that it can be flown with a desired fly height over the rotating disk 155, for example, at less than as 5 μin. Any indication otherwise, can be used as a no-pass indication by the flying head tester 180. It is understood that the flying head 125 can be tested in this manner, with or without its optical and electrical elements attached.

While the foregoing description has described particular embodiments of the present invention, it is to be understood that the above description is not limited by them. It will be appreciated by those skilled in the art that it would be possible to modify the size, shape, appearance and methods of manufacture of various elements of the invention, or to include or exclude various elements and stay within the scope and spirit of the present invention. For example, in other embodiments, the flying heads 125 may comprise a flying optical head or a flying magnetic/optical head, and/or the disk 155 may comprise an optical disk or magnetic/optical disk. Thus, the invention should be limited only by the scope of the claims as set forth below.

What is claimed is:

1. A reflected light responsive head testing apparatus, comprising:

a non-rigid plastic substrate which is rotatable in a manner which stimulates a rotating data storage disc for a disc drive the substrate having thin films thereon comprising amorphous carbon and a lubricant, both chosen to simulate the films on a non-rigid data storage disk;

a source of light;

a test head flying at a desired height over a disc surface opposed to the source of light; and wherein the source of light is directed to and through the substrate and reflects off the head and back to the testing apparatus.

2. The apparatus of claim 1, wherein the substrate comprises a transparent substrate having thin films thereon which are transparent to one or more selected light wavelengths.

3. The apparatus of claim 2, wherein the substrate is transparent to three wavelengths of the source of light.

4. The apparatus of claim 1, wherein an output of the detector is representative of a fly height of the head.

5. The apparatus of claim 4, wherein the head comprises a flying head.

6. The apparatus of claim 4, wherein the head comprises a flying optical head.

7. The apparatus of claim 4, wherein the head comprises a flying magneto-optical head.

8. A test disk for characterization of heads for use with a monochromatic interference based test system, comprising:

a non-rigid plastic substrate having one or more films thereon, the substrates and films being transparent to light and having rotational characteristics which simulate the characteristics of a rotating disc, the films comprising amorphous carbon and a lubricant, both chosen to simulate the films on a non-rigid data storage disk.

9. The test disk of claim 8, wherein the non rigid substrate comprises a thickness of less than or equal to 1.2 millimeters.

10. The test disk of claim 8, wherein the non-rigid substrate comprises features.

11. The test disk of claim 10, wherein the features comprise stamped servo features to further simulate the rotational characteristics of a disk.

12. The test disk of claim 8, wherein the test disk is transparent to at least one wavelength.

13. The test disk of claim 12, wherein the test disk is transparent to three wavelengths of light.

14. A testing apparatus, comprising:

a test substrate means for testing a flying head including film means for simulating the characteristics of a rotating disc including films of a amorphous carbon and a lubricant, both chosen to simulate the films on a non-rigid data storage disk;

a light delivery means for delivering light to the test substrate means; and a detector means for detecting the light and for providing an output based on the light.

15. The testing apparatus of claim 14, wherein the output is representative of a characterization of the head over the test substrate means.

16. The apparatus of claim 3, wherein the substrate is transparent to one or more of wavelengths 436 nm, 546 nm, and 580 nm.

17. The apparatus of claim 16 wherein the testing apparatus is a monochromatic interference based system.

18. The apparatus of claim 17 wherein the testing apparatus is a multi beam system.

19. The apparatus of claim 8 wherein the thin films comprise amorphous carbon and a lubricant, both chosen to simulate the films on a non-rigid disk substrate.

* * * * *